(12) United States Patent
Jiang et al.

(10) Patent No.: US 10,708,167 B2
(45) Date of Patent: Jul. 7, 2020

(54) ROUTING TABLE CREATION METHOD, ELECTRONIC DEVICE, AND NETWORK

(71) Applicant: HUAWEI TECHNOLOGIES CO., LTD., Shenzhen (CN)

(72) Inventors: Sheng Jiang, Beijing (CN); Zongpeng Du, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/022,729

(22) Filed: Jun. 29, 2018

(65) Prior Publication Data
US 2018/0316595 A1 Nov. 1, 2018

Related U.S. Application Data

(63) Continuation of application No. PCT/CN2015/099971, filed on Dec. 30, 2015.

(51) Int. Cl.
H04L 12/751 (2013.01)
H04W 40/28 (2009.01)
(Continued)

(52) U.S. Cl.
CPC .............. *H04L 45/02* (2013.01); *H04L 45/14* (2013.01); *H04L 45/26* (2013.01); *H04L 45/54* (2013.01); *H04W 40/28* (2013.01)

(58) Field of Classification Search
CPC ...... H04L 43/0829; H04L 45/20; H04L 45/54
See application file for complete search history.

(56) References Cited

U.S. PATENT DOCUMENTS 5,940,598 A * 8/1999 Strauss .................. H04L 29/06
370/352
6,804,201 B1 10/2004 Gelenbe
(Continued)

FOREIGN PATENT DOCUMENTS

CN 102333314 A 1/2012
CN 103096410 A 5/2013
(Continued)

OTHER PUBLICATIONS

Tae-Suk Kim et al., "An integrated routing and rate adaptation framework for multi-rate multi-hop wireless networks". Wireless Netw (2013) 19:985-1003, XP55518609, on Nov. 13, 2012, 19 pages.

(Continued)

*Primary Examiner* — Ayaz R Sheikh
*Assistant Examiner* — Debebe A Asefa
(74) *Attorney, Agent, or Firm* — Kilpatrick Townsend & Stockton LLP

(57) ABSTRACT

A routing table creation method, an electronic device, and a network are provided. The method includes: generating a first probe packet, where the first probe packet has a source address and a destination address; sending, from a source node corresponding to the source address, the first probe packet on a network including at least two nodes, until the first probe packet reaches a destination node corresponding to the destination address, and recording addresses of nodes through which the first probe packet passes, to form a first path; generating a second path according to the first path, where the second path is a reverse path of the first path; generating a first response packet, sending the first response packet along a second path until the first response packet reaches the source node; and creating a routing table entry according to the second path.

14 Claims, 7 Drawing Sheets

(51) Int. Cl.
*H04L 12/721* (2013.01)
*H04L 12/741* (2013.01)

(56) References Cited

U.S. PATENT DOCUMENTS

2008/0084888 A1* 4/2008 Yadav ..................... H04L 45/02
370/395.31
2013/0188542 A1 7/2013 Merlin et al.

FOREIGN PATENT DOCUMENTS

| | | | |
|---|---|---|---|
| CN | 103260210 | A | 6/2013 |
| CN | 103457855 | A | 12/2013 |
| CN | 103959723 | A | 7/2014 |
| CN | 104067669 | A | 6/2015 |
| CN | 104683210 | A | 6/2015 |
| EP | 3082306 | A1 | 10/2016 |

OTHER PUBLICATIONS

Florin Josef Latraretu et al., "Fast Source Routed Connection Setup Proposal for a RSUP Implementation", Talfor Journal, vol. 3, No. 2, in 2011, XP55519054, 4 pages.

Vangelis Angelakis, et al., "Probabilistic Routing in Opportunistic Ad Hoc Networks", Wireless Ad-Hoc Networks, chapter 4, in Dec. 2012, XP55519227, 26 pages.

* cited by examiner

ROUTING TABLE CREATION METHOD, ELECTRONIC DEVICE, AND NETWORK

CROSS-REFERENCE TO RELATED APPLICATIONS

This application is a continuation of International Application No. PCT/CN2015/099971, filed on Dec. 30, 2015, the disclosure of which is hereby incorporated by reference in its entirety.

TECHNICAL FIELD

The present invention relates to the field of communications technologies, and in particular, to a routing table creation method, an electronic device, and a network.

BACKGROUND

The Interior Gateway Protocol (English: Interior Gateway Protocol, IGP for short) is a protocol used for exchanging routing information between gateways (a host and a router) on an autonomous network. The routing information can be used by the Internet Protocol (English: Internet Protocol, IP for short) or another network protocol, to describe how route transferring are implemented.

A premise for the IGP protocol is that an IP address is set for each interface of each router. The router is a forwarding device for forwarding an IP packet. Before the IGP protocol is used, various parameters need to be set on the router. For example, in a typical IGP protocol, namely Open Shortest Path First (English: Open Shortest Path First, OSPF for short), a process number, a router identifier (RouterID), an area identity (area-id), an associated IP, a wildcard mask, and the like need to be configured on a router.

The IGP routing protocol includes the following content: Each router periodically sends interface information (which includes a link cost value) of the router to a peripheral device, and also forwards interface information sent by another router. After information about each router is sent to all other routers on a network, each router calculates a structural topology diagram of an entire network. Each router calculates a shortest-path tree between the router and any other known node (that is, a network segment of each interface of the router) by using the router as a root according to the network structural topology diagram of the router and generates a routing table. Index entries of the routing table are all network segments learned in an information exchange process, and a forwarding entry corresponding to each network segment is filled in according to an outbound interface and a next hop that are indicated by a topology of the tree. Therefore, a possible IP routing table entry includes a destination IP address, a next-hop IP address, and a next-hop outbound interface of a packet.

When the network topology changes, for example, when a link is disconnected, the foregoing steps are repeated to recreate a routing table entry.

It can be learned from the foregoing description that, in a manner of creating the routing table by using the IGP routing protocol, many parameters need to be configured on each routing node. For example, a process number, a router identifier, an area identity, an associated IP, a wildcard mask, and the like need to be configured on the router.

SUMMARY

Embodiments of the present invention provide a routing table creation method, an electronic device, and a network, to resolve a prior-art technical problem that a relatively great quantity of parameters need to be configured and zero configurations cannot be implemented in a manner of creating a routing table.

According to a first aspect, an embodiment of the present invention provides a routing table creation method, including:

obtaining, by a first node, a first probe packet, where the first probe packet has a source address and a destination address, and the first node is a source node corresponding to the source address or an intermediate node on a path between the source node and a destination node corresponding to the destination address; obtaining, by the first node, a new first probe packet, where when the first node is the intermediate node, the first node records an address of the first node in the first probe packet to form the new first probe packet, and when the first node is the source node, the new first probe packet is the first probe packet; sending, by the first node, the new first probe packet; receiving, by the first node, the first response packet, where the first response packet includes a second path, the second path is a reverse path of a first path, and the first path includes addresses of nodes through which the new first probe packet passes; and creating, by the first node, a routing table entry according to a preceding address of the address of the first node on the second path, where the routing table entry includes the destination address, and an address of a next hop node and an outbound interface, and the address of the next hop node is the preceding address.

It can be learned from the foregoing description that, in this embodiment of the present invention, nodes on the path between the source node and the destination node are recorded by using a probe packet, and a response packet is forwarded from the destination node to the source node along the reverse path, so that the source node and the intermediate node conveniently create routing table entries. Compared with a routing table entry creation manner described in the IGP protocol in the prior art, the routing table creation method in this embodiment of the present invention is simpler, and each node can implement routing table creation with zero configurations.

With reference to the first aspect, in a first possible implementation of the first aspect, the method further includes: creating, by the first node, a path evaluation table entry, where the path evaluation table entry includes the source address and the destination address, the address of the next hop node and the outbound interface, an evaluated value that is of both the next hop node and the outbound interface, and a service identifier and/or a service target, and the address of the next hop node is the preceding address. This embodiment is used to evaluate the routing table entry, so as to facilitate monitoring and optimization of the routing table entry.

With reference to the first aspect or the first possible implementation of the first aspect, in a second possible implementation of the first aspect, the sending, by the first node, the new first probe packet includes: randomly selecting, by the first node, a next hop node and an outbound interface, and sending the new first probe packet.

According to a second aspect, an embodiment of the present invention provides a routing table management method, including:

obtaining, by a first node, a second probe packet, where the second probe packet has a source address and a destination address, and the first node is a source node corresponding to the source address or an intermediate node on a path between the source node and a destination node corresponding to the destination address; obtaining, by the first node, a new second probe packet, where when the first node is the intermediate node, the first node records an address of the first node in the second probe packet to form the new second probe packet, and when the first node is the source node, the new second probe packet is the second probe packet; sending, by the first node, the new second probe packet based on a predetermined probability and according to a pre-created routing table entry; receiving, by the first node, a second response packet, where the second response packet includes a fourth path, the fourth path is a reverse path of a third path, and the third path includes addresses of nodes through which the new second probe packet passes; and if a match is successfully found in the routing table entry, and a preceding address of the address of the first node on the fourth path is the same as an address of a next hop node in the routing table entry, updating, by the first node, an evaluated value that is of both the next hop node and an outbound interface in a pre-created path evaluation table entry.

It can be learned from the foregoing description that, in this embodiment of the present invention, a probe packet and a response packet are used to monitor a pre-created routing table, so as to improve adaptability of the routing table.

With reference to the second aspect, in a first possible implementation of the second aspect, the method further includes: if no match is successfully found in the routing table entry, creating, by the first node, a new routing table entry according to the preceding address of the address of the first node on the fourth path. This embodiment can be used to discover a new path, so as to implement coexistence of multiple paths.

With reference to the second aspect, in a second possible implementation of the second aspect, the method further includes:

if a match is successfully found in the routing table entry, and the preceding address of the address of the first node on the fourth path is different from the address of the next hop node in the routing table entry, determining, by the first node, whether to update the routing table entry. The method in this embodiment can be used to optimize the routing table entry, so that a routing table has higher adaptability.

The second aspect or the first possible implementation of the second aspect or the second possible implementation of the second aspect may be integrated into the first aspect or the first possible implementation of the first aspect or the second possible implementation of the first aspect.

According to a third aspect, an embodiment of the present invention provides a routing table creation method, including: generating, by a source node, a first probe packet, where the first probe packet has a source address and a destination address, and the source address is an address of the source node; sending, by the source node, the first probe packet; receiving, by the source node, a first response packet, where the first response packet includes a second path, the second path is a reverse path of a first path, and the first path includes addresses of nodes through which the first probe packet passes; generating, by the source node, a first-path creation packet, where the first-path creation packet includes the first path; and creating, by the source node, a routing table entry according to an address of a next hop node and an outbound interface of the source address on the first path, where the routing table entry includes the destination address, and the address of the next hop node and the outbound interface.

It can be learned from the foregoing description that, in this embodiment of the present invention, nodes on a path between the source node and a destination node are recorded by using a probe packet, a response packet is forwarded from the destination node to the source node along a reverse path, and reverse path processing is performed to generate the first-path creation packet, so that the source node conveniently creates the routing table entry. Compared with a routing table entry creation manner described in the IGP protocol in the prior art, the routing table creation method in this embodiment of the present invention is simpler, and each node can implement routing table creation with zero configurations.

With reference to the third aspect, in a first possible implementation of the third aspect, the method further includes: if a routing table entry has been created, and an outbound interface in the already-created routing table entry is different from an outbound interface corresponding to the first path, determining, by the source node, whether the outbound interface corresponding to the first path is better; and when the outbound interface corresponding to the first path is better, updating, by the source node, the already-created routing table entry. This embodiment can be used for monitoring and optimizing a routing table, so as to improve adaptability of the routing table.

With reference to the third aspect, in a second possible implementation of the third aspect, the method further includes: sending, by the source node, the first-path creation packet to an intermediate node between the source node and the destination node on the first path, so that the intermediate node updates a routing table entry of the intermediate node according to an address of a next hop and an outbound interface of an address of the intermediate node on the first path.

The second aspect or the first possible implementation of the second aspect or the second possible implementation of the second aspect may be integrated into the third aspect or the first possible implementation of the third aspect or the second possible implementation of the third aspect.

According to a fourth aspect, an embodiment of the present invention provides a routing table creation method, including: generating a first probe packet, where the first probe packet has a source address and a destination address; sending, from a source node corresponding to the source address, the first probe packet on a network including at least two nodes, until the first probe packet reaches a destination node corresponding to the destination address, and recording addresses of nodes through which the first probe packet passes, to form a first path; generating a second path according to the first path, where the second path is a reverse path of the first path; generating a first response packet, where the first response packet includes the second path; sending the first response packet along the second path until the first response packet reaches the source node; and creating a routing table entry according to the second path, where the routing table entry includes the destination address, and an address of a next hop node and an outbound interface.

With reference to the fourth aspect, in a first possible implementation of the fourth aspect, the method further includes: creating a path evaluation table entry according to the second path and a service target, where the path evaluation table entry includes the source address and the destination address, the address of the next hop node and the outbound interface, an evaluated value that is of both the next hop node and the outbound interface, and a service identifier and/or a service target.

According to a fifth aspect, an embodiment of the present invention provides a routing table management method, including: generating a second probe packet, where the second probe packet has the source address and the destination address; sending, from a source node corresponding to the source address on a network including at least two nodes, the second probe packet based on a predetermined probability and according to a preset routing table entry until the second probe packet reaches a destination node corresponding to the address, and recording addresses of nodes through which the second probe packet passes, to form a third path; generating a fourth path according to the third path, where the fourth path is a reverse path of the third path; generating a second response packet, where the second response packet includes the fourth path; sending the second response packet along the fourth path until the second response packet reaches the source node; and if a match is successfully found in the routing table entry, and an address of a next hop on the fourth path and an outbound interface are different from an address of a next hop and an outbound interface in the routing table entry, adding an address of a new next hop node and a new outbound interface to the routing table entry, and adding an evaluated value that is of both the new next hop node and the new outbound interface to a pre-created path evaluation table entry; or determining whether to update the routing table entry.

With reference to the fifth aspect, in a first possible implementation of the fifth aspect, the method further includes: if a match is successfully found in the routing table entry, and the address of the next hop on the fourth path and the outbound interface are the same as the address of the next hop and the outbound interface in the routing table entry, updating an evaluated value of the next hop node and the outbound interface in the pre-created path evaluation table entry.

With reference to the fifth aspect, in a second possible implementation of the fifth aspect, the method further includes: if no match is successfully found in the routing table entry, creating a new routing table entry according to the fourth path, and creating a new path evaluation table entry.

With reference to the fifth aspect, in a third possible implementation of the fifth aspect, the determining whether to update the routing table entry includes: determining an evaluated value that is of both a new next hop node and a new outbound interface; and determining, according to the evaluated value that is of both the new next hop node and the new outbound interface and an evaluated value that is of both the next hop node and the outbound interface in the pre-created path evaluation table entry, whether to update the routing table entry.

With reference to the fifth aspect, in a fourth possible implementation of the fifth aspect, the determining whether to update the routing table entry includes: determining an evaluated value that is of both a new next hop node and a new outbound interface; and inputting the evaluated value that is of both the new next hop node and the new outbound interface into a random neural network; and determining, according to a computation result of the random neural network, whether to update a routing table, where each neuron of the random neural network is corresponding to an outbound interface, and the random neural network is trained by using a historical evaluated value that is of both a next hop node and an outbound interface.

Any one of the fifth aspect, or the first possible implementation of the fifth aspect to the fourth possible implementation of the fifth aspect may be integrated into the fourth aspect or the first possible implementation of the fourth aspect.

According to a sixth aspect, an embodiment of the present invention provides a routing table creation method, including: generating a first probe packet, where the first probe packet has a source address and a destination address; sending, from a source node corresponding to the source address, the first probe packet on a network including at least two nodes, until the first probe packet reaches a destination node corresponding to the destination address, and recording addresses of nodes through which the first probe packet passes, to form a first path; generating a second path according to the first path, where the second path is a reverse path of the first path; generating a first response packet, where the first response packet includes the second path; sending the first response packet along the second path until the first response packet reaches the source node; generating a first-path creation packet, where the first-path creation packet includes a reverse path of the second path; and creating a routing table entry according to the reverse path, where the routing table entry includes the destination address, and an address of a next hop node and an outbound interface.

With reference to the sixth aspect, in a first possible implementation of the sixth aspect, the method further includes: if a routing table entry has been created, and an outbound interface in the already-created routing table entry is different from an outbound interface corresponding to the reverse path, determining whether the outbound interface corresponding to the reverse path is better; and when the outbound interface corresponding to the reverse path is better, updating the already-created routing table entry.

With reference to the sixth aspect, in a second possible implementation of the sixth aspect, the method further includes: generating a second probe packet, where the second probe packet has the source address and the destination address; sending, from the source node based on a predetermined probability and according to the routing table entry, the second probe packet until the second probe packet reaches the destination node on the network, and recording addresses of nodes through which the second probe packet passes, to form a third path; generating a fourth path according to the third path, where the fourth path is a reverse path of the third path; generating a second response packet, where the second response packet includes the fourth path; sending the second response packet along the fourth path until the second response packet reaches the source node; and if a match is successfully found in the routing table entry, and an address of a next hop on the fourth path and an outbound interface are the same as an address of a next hop and an outbound interface in the routing table entry, updating an evaluated value that is of both the next hop node and the outbound interface in a pre-created path evaluation table entry.

According to a seventh aspect, an embodiment of the present invention provides a packet sending method, including: receiving a service packet, where the service packet has a destination address and includes a service identifier and/or a service target; performing longest matching in a pre-created routing table entry according to the destination address, and the service identifier and/or the service target, where the routing table entry includes the destination address, an address of a next hop node and an outbound interface, and the service identifier and/or the service target; and sending the service packet by using an address of a next hop node and an outbound interface that are successfully matched in the routing table entry.

According to an eighth aspect, an embodiment of the present invention provides an electronic device, including: a processor, configured to generate a first probe packet, where the first probe packet has a source address and a destination address, the electronic device serves as a source node, and the source address is an address of the source node; an interface; a transmitter, configured to send the first probe packet by using the interface; and a receiver, configured to receive the first response packet by using the interface, where the first response packet includes a second path, the second path is a reverse path of a first path, and the first path includes addresses of nodes through which the first probe packet passes, where the processor is further configured to create a routing table entry according to a preceding address of an address of the electronic device on the second path, where the routing table entry includes the destination address, and an address of a next hop node and an outbound interface, and the address of the next hop node is the preceding address.

With reference to the eighth aspect, in a first possible implementation of the eighth aspect, the processor is further configured to create a path evaluation table entry, where the path evaluation table entry includes the source address and the destination address, the address of the next hop node and the outbound interface, an evaluated value that is of both the next hop node and the outbound interface, and a service identifier and/or a service target, and the address of the next hop node is the preceding address.

With reference to the eighth aspect or the first possible implementation of the eighth aspect, in a second possible implementation of the eighth aspect, the transmitter is configured to: randomly select a next hop node and an outbound interface, and send the first probe packet.

According to a ninth aspect, an embodiment of the present invention provides an electronic device, including: an interface; a receiver, configured to receive a first probe packet by using the interface, where the first probe packet has a source address and a destination address, and an address of a node through which the first probe packet has passed so far, and the electronic device is an intermediate node on a path between a source node corresponding to the source address and a destination node corresponding to the destination address; a processor, configured to record an address of the electronic device in the first probe packet, to form a new first probe packet; and a transmitter, configured to send the new first probe packet by using the interface, where the receiver is further configured to receive the first response packet by using the interface, where the first response packet includes a second path, the second path is a reverse path of a first path, and the first path includes addresses of nodes through which the new first probe packet passes; and the processor is further configured to create a routing table entry according to a preceding address of the address of the electronic device on the second path, where the routing table entry includes the destination address, and an address of a next hop node and an outbound interface, and the address of the next hop node is the preceding address.

With reference to the ninth aspect, in a first possible implementation of the ninth aspect, the processor is further configured to create a path evaluation table entry, where the path evaluation table entry includes the source address and the destination address, the address of the next hop node and the outbound interface, an evaluated value that is of both the next hop node and the outbound interface, and a service identifier and/or a service target, and the address of the next hop node is the preceding address.

According to a tenth aspect, an embodiment of the present invention provides an electronic device, including: a processor, configured to generate a second probe packet, where the second probe packet has a source address and a destination address, the electronic device serves as a source node, and the source address is an address of the source node; an interface; a transmitter, configured to send the second probe packet based on a predetermined probability and according to a pre-created routing table entry; and a receiver, configured to receive a second response packet by using the interface, where the second response packet includes a fourth path, the fourth path is a reverse path of a third path, and the third path includes addresses of nodes through which the second probe packet passes, where the processor is further configured to: if a match is successfully found in the routing table entry, and a preceding address of an address of the electronic device on the fourth path is the same as an address of a next hop node in the routing table entry, update an evaluated value that is of both the next hop node and an outbound interface in a pre-created path evaluation table entry.

With reference to the tenth aspect, in a first possible implementation of the tenth aspect, the processor is further configured to: if no match is successfully found in the routing table entry, create a new routing table entry according to the preceding address of the address of the electronic device on the fourth path.

With reference to the tenth aspect, in a second possible implementation of the tenth aspect, the processor is further configured to: if a match is successfully found in the routing table entry, and the preceding address of the address of the electronic device on the fourth path is different from the address of the next hop node in the routing table entry, determine whether to update the routing table entry.

With reference to the second possible implementation of the tenth aspect, in a third possible implementation of the tenth aspect, the processor is configured to: determine an evaluated value that is of both a new next hop node and a new outbound interface, and determine, according to the evaluated value that is of both the new next hop node and the new outbound interface and the evaluated value that is of both the next hop node and the outbound interface in the path evaluation table entry, whether to update the routing table entry.

With reference to the second possible implementation of the tenth aspect, in a fourth possible implementation of the tenth aspect, the processor is configured to: determine an evaluated value that is of both a new next hop node and a new outbound interface; input the evaluated value that is of both the new next hop node and the new outbound interface into a random neural network; and determine, according to a computation result of the random neural network, whether to update a routing table, where each neuron of the random neural network is corresponding to an outbound interface, and the random neural network is trained by using a historical evaluated value that is of both a next hop node and an outbound interface.

According to an eleventh aspect, an embodiment of the present invention provides an electronic device, including: an interface; a receiver, configured to receive a second probe packet by using the interface, where the second probe packet has a source address and a destination address, and an address of a node through which the second probe packet has passed so far, and the electronic device is an intermediate node on a path between a source node corresponding to the source address and a destination node corresponding to the destination address; a processor, configured to record an address of the electronic device in the second probe packet, to form the new second probe packet; and a transmitter, configured to send, by using the interface, the new second probe packet based on a predetermined probability and according to a pre-created routing table entry, where the receiver is further configured to receive a second response packet, where the second response packet includes a fourth path, the fourth path is a reverse path of a third path, and the third path includes addresses of nodes through which the new second probe packet passes; and the processor is further configured to: if a match is successfully found in the routing table entry, and a preceding address of the address of the electronic device on the fourth path is the same as an address of a next hop node in the routing table entry, update an evaluated value that is of both the next hop node and an outbound interface in the path evaluation table entry.

With reference to the eleventh aspect, in a first possible implementation of the eleventh aspect, the processor is further configured to: when no match is successfully found in the routing table entry, create a new routing table entry according to the preceding address of the address of the electronic device on the fourth path.

With reference to the eleventh aspect, in a second possible implementation of the eleventh aspect, the processor is further configured to: if a match is successfully found in the routing table entry, and the preceding address of the address of the electronic device on the fourth path is different from the address of the next hop node in the routing table entry, determine whether to update the routing table entry.

With reference to the second possible implementation of the eleventh aspect, in a third possible implementation of the eleventh aspect, the processor is configured to: determine an evaluated value that is of both a new next hop node and a new outbound interface, and determine, according to the evaluated value that is of both the new next hop node and the new outbound interface and the evaluated value that is of both the next hop node and the outbound interface in the path evaluation table entry, whether to update the routing table entry.

With reference to the second possible implementation of the eleventh aspect, in a fourth possible implementation of the eleventh aspect, the processor is configured to: determine an evaluated value that is of both a new next hop node and a new outbound interface; input the evaluated value that is of both the new next hop node and the new outbound interface into a random neural network; and determine, according to a computation result of the random neural network, whether to update a routing table, where each neuron of the random neural network is corresponding to an outbound interface, and the random neural network is trained by using a historical evaluated value that is of both a next hop node and an outbound interface.

According to a twelfth aspect, an embodiment of the present invention provides an electronic device, including: a processor, configured to generate a first probe packet, where the first probe packet has a source address and a destination address, the source address is an address of the electronic device, and the electronic device serves as a source node; an interface; a transmitter, configured to send the first probe packet by using the interface; and a receiver, configured to receive a first response packet by using the interface, where the first response packet includes a second path, the second path is a reverse path of a first path, and the first path includes addresses of nodes through which the first probe packet passes, where the processor is further configured to: generate a first-path creation packet, where the first-path creation packet includes the first path; and create a routing table entry according to an address of a next hop node and an outbound interface of the source address on the first path, where the routing table entry includes the destination address, and the address of the next hop node and the outbound interface.

With reference to the twelfth aspect, in a first possible implementation of the twelfth aspect, the processor is further configured to: if a routing table entry has been created, and an outbound interface in the already-created routing table entry is different from an outbound interface corresponding to the first path, determine whether the outbound interface corresponding to the first path is better; and when the outbound interface corresponding to the first path is better, update the already-created routing table entry.

With reference to the twelfth aspect or the first possible implementation of the twelfth aspect, in a second possible implementation of the twelfth aspect, the transmitter is further configured to send, by using the interface, the first-path creation packet to an intermediate node between the source node and the destination node on the first path, so that the intermediate node updates a routing table entry of the intermediate node according to an address of a next hop and an outbound interface of an address of the intermediate node on the first path.

With reference to the twelfth aspect, the first possible implementation of the twelfth aspect, or the second possible implementation of the twelfth aspect, in a third possible implementation of the twelfth aspect, the processor is further configured to generate a second probe packet, where the second probe packet has the source address and the destination address; the transmitter is further configured to send the second probe packet based on a predetermined probability and according to the routing table entry; the receiver is further configured to receive a second response packet by using the interface, where the second response packet includes a fourth path, the fourth path is a reverse path of a third path, and the third path includes addresses of nodes through which the second probe packet passes; and the processor is further configured to: if a match is successfully found in the routing table entry, and an address of a next hop and an outbound interface of the source address on the fourth path are the same as an address of a next hop and an outbound interface in the routing table entry, update an evaluated value that is of both the next hop node and the outbound interface in a pre-created path evaluation table entry.

According to a thirteenth aspect, an embodiment of the present invention provides a network, and the network includes a source node, a destination node, and intermediate nodes between the source node and the destination node; the source node is configured to: generate a first probe packet, and send the first probe packet to a neighboring intermediate node of the source node, where the first probe packet has a source address of the source node and a destination address of the destination node; the intermediate nodes from the neighboring intermediate node to a neighboring intermediate node of the destination node are configured to: sequentially send the first probe packet until the first probe packet reaches the destination node, and record respective addresses in the first probe packet to form a first path; the destination node is configured to: generate a second path according to the first path, where the second path is a reverse path of the first path, and generate a first response packet, where the first response packet includes the second path; the destination node and the intermediate nodes are configured to sequentially send the first response packet along the second path until the first response packet reaches the source node; and the intermediate nodes and the source node are configured to create a routing table entry according to the second path, where the routing table entry includes the destination address, and an address of a next hop node and an outbound interface.

With reference to the thirteenth aspect, in a first possible implementation of the thirteenth aspect, the intermediate nodes and the source node are further configured to create a path evaluation table entry according to the second path and a service target, where the path evaluation table entry includes the source address and the destination address, the address of the next hop node and the outbound interface, an evaluated value that is of both the next hop node and the outbound interface, and a service identifier and/or the service target.

According to a fourteenth aspect, an embodiment of the present invention provides a network, and the network includes a source node, a destination node, and intermediate nodes between the source node and the destination node; the source node is configured to: generate a second probe packet, and send the second probe packet to a neighboring intermediate node, where the second probe packet has a source address of the source node and a destination address of the destination node; the intermediate nodes from the neighboring intermediate node to a neighboring intermediate node of the destination node are configured to: sequentially send the second probe packet based on a predetermined probability and according to a preset routing table entry, until the second probe packet reaches the destination node corresponding to the address, and record respective addresses in the second probe packet to form a third path; the destination node is configured to: generate a fourth path according to the third path, and generate a second response packet, where the fourth path is a reverse path of the third path, and the second response packet includes the fourth path; the destination node and the intermediate nodes are configured to sequentially send the second response packet along the fourth path until the second response packet reaches the source node; and the intermediate nodes and the source node are configured to: if a match is successfully found in the routing table entry, and an address of a next hop on the fourth path and an outbound interface are different from an address of a next hop and an outbound interface in the routing table entry, add an address of a new next hop node and a new outbound interface node to the routing table entry, and add an evaluated value that is of both the new next hop node and the new outbound interface to a pre-created path evaluation table entry; or determine whether to update the routing table entry.

With reference to the fourteenth aspect, in a first possible implementation of the fourteenth aspect, the intermediate nodes and the source node are further configured to: if a match is successfully found in the routing table entry, and the address of the next hop on the fourth path and the outbound interface are the same as the address of the next hop and the outbound interface in the routing table entry, update an evaluated value that is of both the next hop node and the outbound interface in the pre-created path evaluation table entry.

With reference to the fourteenth aspect, in a second possible implementation of the fourteenth aspect, the intermediate nodes and the source node are further configured to: if no match is successfully found in the routing table entry, create a new routing table entry according to the fourth path, and create a new path evaluation table entry.

The fourteenth aspect or the first possible implementation of the fourteenth aspect or the second possible implementation of the fourteenth aspect may be integrated into the thirteenth aspect or the first possible implementation of the thirteenth aspect.

According to a fifteenth aspect, an embodiment of the present invention provides a network, and the network includes a source node, a destination node, and intermediate nodes between the source node and the destination node; the source node is configured to: generate a first probe packet, and send the first probe packet to a neighboring intermediate node, where the first probe packet has a source address of the source node and a destination address of the destination node; the intermediate nodes from the neighboring intermediate node to a neighboring intermediate node of the destination node are configured to: sequentially send the first probe packet until the first probe packet reaches the destination node, and record respective addresses in the first probe packet to form a first path; the destination node is configured to: generate a second path according to the first path, and generate a first response packet, where the second path is a reverse path of the first path, and the first response packet includes the second path; the destination node and the intermediate nodes are configured to send the first response packet along the second path until the first response packet reaches the source node; the source node is further configured to generate a first-path creation packet, and create a routing table entry according to the reverse path, where the first-path creation packet includes a reverse path of the second path, and the routing table entry includes the destination address, and an address of a next hop node and an outbound interface; the source node is further configured to send the first-path creation packet to the neighboring intermediate node; and the intermediate nodes from the neighboring intermediate node to the neighboring intermediate node of the destination node are configured to: when receiving the first-path creation packet, create a routing table entry according to the reverse path.

With reference to the fifteenth aspect, in a first possible implementation of the fifteenth aspect, the source node is further configured to: if a routing table entry has been created, and an outbound interface in the already-created routing table entry is different from an outbound interface corresponding to the reverse path, determine whether the outbound interface corresponding to the reverse path is better; and when the outbound interface corresponding to the reverse path is better, update the already-created routing table entry.

According to a sixteenth aspect, an embodiment of the present invention provides an electronic device, including: an interface; a receiver, configured to receive a service packet, where the service packet has a destination address and includes a service identifier and/or a service target; a processor, configured to perform longest matching in a pre-created routing table entry according to the destination address, and the service identifier and/or the service target, where the routing table entry includes the destination address, an address of a next hop node and an outbound interface, and the service identifier and/or the service target; and a transmitter, configured to send the service packet by using an address of a next hop node and an outbound interface that are successfully matched in the routing table entry, where the outbound interface is an interface of the interface.

According to a seventeenth aspect, an embodiment of the present invention provides an electronic device, and the electronic device includes a functional unit configured to implement the method in the first aspect, the first possible implementation of the first aspect, or the second possible implementation of the first aspect.

According to an eighteenth aspect, an embodiment of the present invention provides an electronic device, and the electronic device includes a functional unit configured to implement the method in any one of the second aspect, or the first possible implementation of the second aspect to the fourth possible implementation of the second aspect.

According to a nineteenth aspect, an embodiment of the present invention provides an electronic device, and the electronic device includes a functional unit configured to implement the method in the third aspect, the first possible implementation of the third aspect, or the second possible implementation of the third aspect.

According to a twentieth aspect, an embodiment of the present invention provides an electronic device, and the electronic device includes a functional unit configured to implement the method in the seventh aspect.

DESCRIPTION OF EMBODIMENTS

The embodiments of the present invention provide a routing table creation method, an electronic device, and a network, to resolve a prior-art technical problem that in a manner of creating a routing table, a relatively great quantity of parameters need to be configured and zero configurations cannot be implemented.

The following clearly describes in detail the objectives, technical solutions, and advantages of the embodiments of the present invention with reference to the accompanying drawings.

Figure 1A:
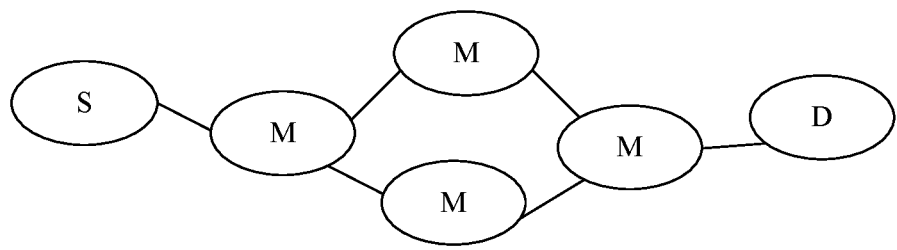
FIG. 1a to FIG. 1c are structural diagrams of networks according to an embodiment of the present invention.
Figure 1B:
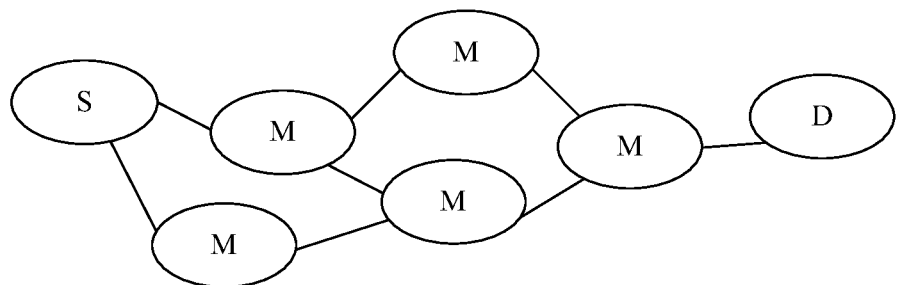
Figure 1C:
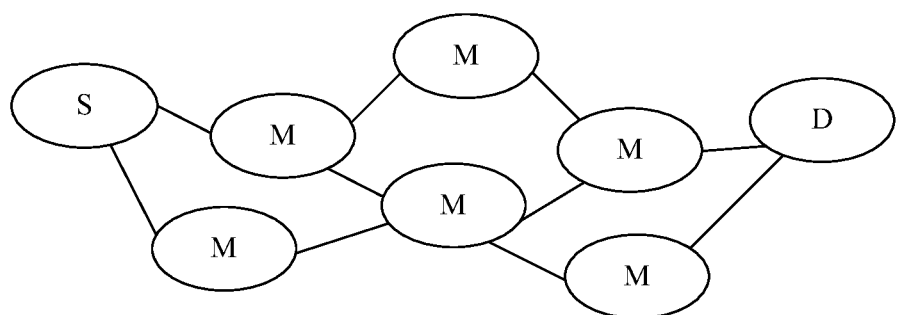

An embodiment of the present invention provides a routing table creation method, and the method may be applied to a network. Referring to FIG. 1a to FIG. 1c, FIG. 1a to FIG. 1c are possible structural diagrams of networks in this embodiment of the present invention. As shown in FIG. 1a to FIG. 1c, the network includes a source node S, an intermediate node M, and a destination node D. The source node S, the intermediate node M, and the destination node D may all be router devices, and may be specifically an access router, a convergence router, a core router, or an enterprise-network router (such as an enterprise-network edge router), or may be a home gateway, as shown in a network shown in FIG. 1c. For another example, the source node S may be user equipment, and is connected to the Internet by using a home gateway, to perform Voice over Internet Protocol (English: Voice over Internet Protocol, VoIP for short) communication with another user equipment. In this case, both the source node S and the destination node D are user equipments, and the intermediate node M is a router, as shown in a network in FIG. 1a. For another example, the destination node D may be considered to be a server of a service provider or a content provider. For another example, the source node S, the intermediate node M, and the destination node D may all be home devices, enterprise network devices, or user equipment.

Optionally, the network may be an IP network, and each node has its own IP address. Communication is performed on the entire network by using an IP address.

Optionally, the network may be a non-IP network. On the non-IP network, an address may be a communication address corresponding to the non-IP network, but not an IP address. Communication is performed on the entire network by using the communication address.

The user equipment mentioned in this specification may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (English: Radio Access Network, RAN for short). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. For example, it may be a device such as a personal communication service (English: Personal Communication Service, PCS for short) phone, a cordless telephone set, a Session Initiation Protocol (English: Session Initiation Protocol, SIP for short) phone, a wireless local loop (English: Wireless Local Loop, WLL for short) station, or a personal digital assistant (English: Personal Digital Assistant, PDA for short). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), a user device (User Device or User Equipment).

Figure 2:
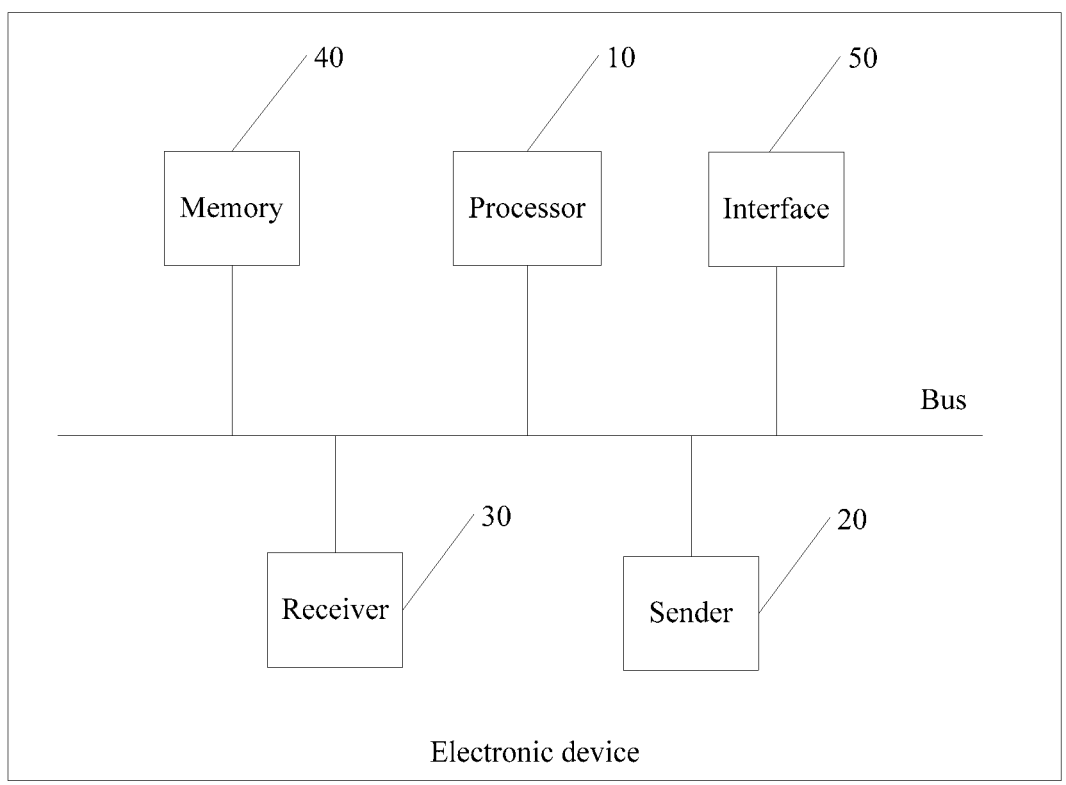
FIG. 2 is a structural diagram of an electronic device according to an embodiment of the present invention.

Next, referring to FIG. 2, FIG. 2 is a possible structural diagram of an electronic device according to an embodiment of the present invention. The electronic device is a source node S, an intermediate node M, or a destination node D. As shown in FIG. 2, the electronic device includes a processor 10, a transmitter 20, a receiver 30, a memory 40, and an interface 50. The memory 40, the transmitter 20, and the receiver 30 and the processor 10 may be connected by using a bus. Certainly, in an actual application, the memory 40, the transmitter 20, and the receiver 30 and the processor 10 may be not of a bus structure, but may be of another structure, for example, a star-type structure, and no specific limitation is set thereto in this application.

Optionally, the processor 10 may specifically be a central processing unit, an application-specific integrated circuit (English: Application Specific Integrated Circuit, ASIC for short), one or more integrated circuits configured to control program execution, a hardware circuit developed by using a field programmable gate array (English: Field Programmable Gate Array, FPGA for short), or a baseband processor.

Optionally, the processor 10 may include at least one processing core.

Optionally, the memory 40 may include a read-only memory (English: Read Only Memory, ROM for short), a random access memory (English: Random Access Memory, RAM for short), and a magnetic disk memory. The memory 40 is configured to store data required by the processor 10 when the processor 10 is running. There may be one or more memories 40.

Optionally, there are one or more interfaces 50, which are configured to connect to a neighboring node.

Optionally, the transmitter 20 and the receiver 30 may be physically independent or may be integrated together. The transmitter 20 may send a packet to another node by using the interface 50. The receiver 30 may receive, by using the interface 50, data sent by another node.

Figure 3:
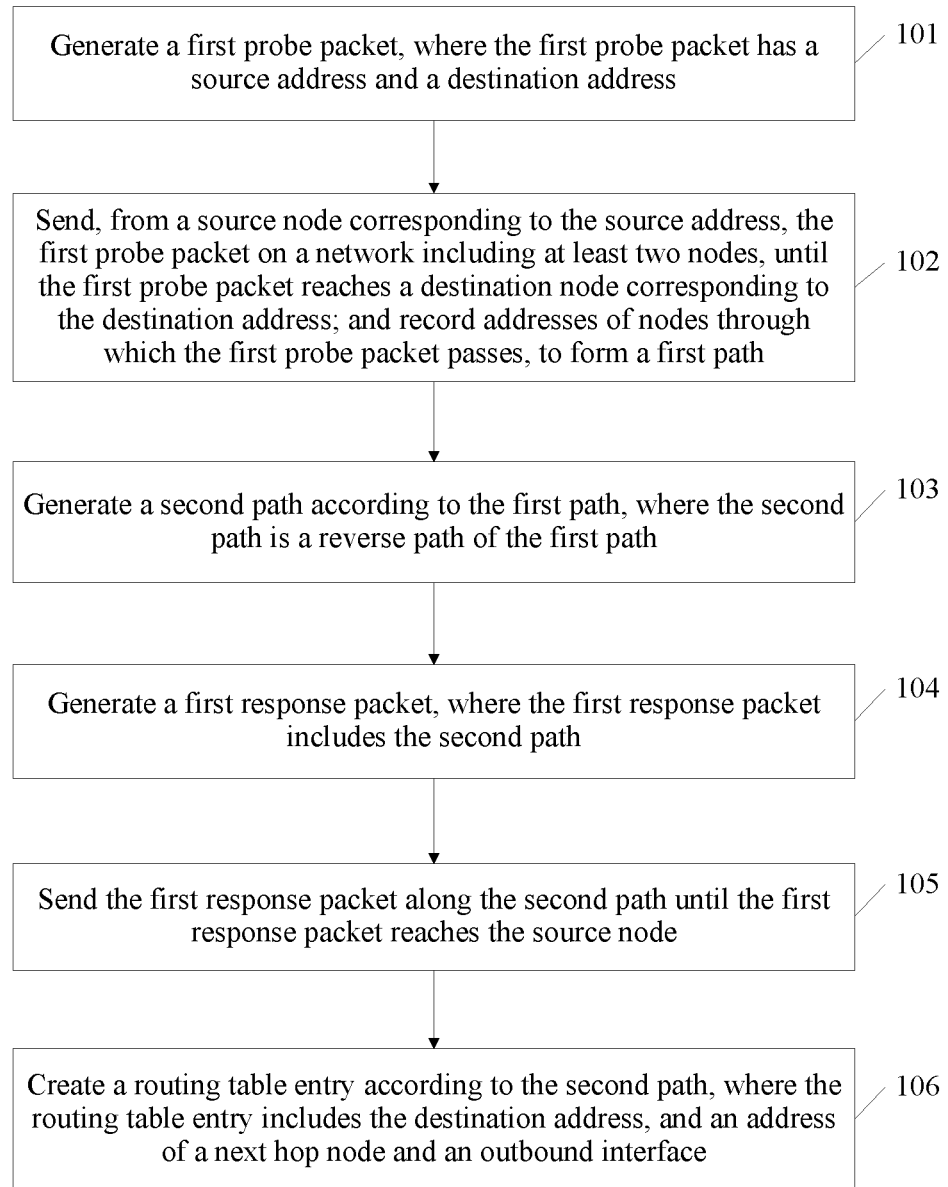
FIG. 3 is a flowchart of a routing table creation method according to an embodiment of the present invention.

Next, referring to FIG. 3, FIG. 3 is a flowchart of a routing table creation method according to an embodiment of the present invention. As shown in FIG. 3, the method includes the following steps.

Step 101: Generate a first probe packet, where the first probe packet has a source address and a destination address.

Step 102: Send, from a source node corresponding to the source address, the first probe packet on a network including at least two nodes, until the first probe packet reaches a destination node corresponding to the destination address; and record addresses of nodes through which the first probe packet passes, to form a first path.

Step 103: Generate a second path according to the first path, where the second path is a reverse path of the first path.

Step 104: Generate a first response packet, where the first response packet includes the second path.

Step 105: Send the first response packet along the second path until the first response packet reaches the source node.

Step 106: Create a routing table entry according to the second path, where the routing table entry includes the destination address, and an address of a next hop node and an outbound interface.

Specifically, step 101 is performed by a source node S. For example, when a service needs to access a network, the source node S generates a first probe packet (English: Exploring Packet, EP for short). The first EP has a source address and a destination address. The source address is an IP address of the source node S. The destination address is an IP address of a destination node D.

Then, step 102 is performed, that is, the first EP packet is sent from the source address, for example, on the foregoing network until reaching the destination address. Specifically, the source node S first sends the first EP packet. If the source node S has only one outbound interface, that is, an interface 50 described above, a transmitter 20 of the source node S sends, by using the unique interface 50, the first EP to an intermediate node M connected to the interface 50. If the source node S has multiple outbound interfaces, that is, there are multiple interfaces 50, the transmitter 20 of the source node S may randomly select an interface 50 to send the first EP to an intermediate node M connected to the interface 50. Certainly, in an actual application, in addition to a manner of randomly selecting an interface, the source node and the intermediate node may use another manner, for example, sending the first EP from a preset specified outbound interface or sending the first EP in a broadcast manner.

When receiving the first EP, the intermediate node M may perform an operation similar to that performed by the source node S, that is, write an address of the intermediate node M into the first EP, to form a new first EP, and randomly select an interface 50 or a preset specified interface 50, and send the new first EP. A following intermediate node M repeats the foregoing process, until the first EP reaches the destination node D. At this time, step 102 is completed.

When the first EP reaches the destination node D, address of nodes through which the first EP passes have been recorded in the first EP, to form the first path.

Optionally, the first EP also records a time stamp of each node. A function of the time stamp is described in detail below.

It should be noted that a time to live (English: Time to live, TTL for short) may be set for the first EP. Therefore, when the first EP is being sent, the first EP may probably be discarded because the TTL becomes 0 before the first EP reaches the destination node D.

After the first EP reaches the destination node D, the destination node D may perform step 103 and step 104. Specifically, in step 103, a loop on the first path may be removed first, and a reverse path of a loop-free first path is used as the second path. The destination node D generates the first response packet (English: Response Packet, RP for short), and adds the second path to the first RP. In other words, the first RP can reach the source node hop by hop according to the second path.

Then, step 105 is performed. Specifically, a transmitter 20 of the destination node D sends the first RP to the intermediate node M by using the second path. For example, if the first path is the source node S→an intermediate node M1→an intermediate node M2→an intermediate node M3→the destination node D, the second path is the destination node D→the intermediate node M3→the intermediate node M2→the intermediate node M1→the source node S. The intermediate node M indicates that the first EP is forwarded by the intermediate node M. The destination node D sends the first RP to the intermediate node M3 according to the second path.

When receiving the first RP, the intermediate node M performs an operation similar to that performed by the destination node D, that is, sends the first RP according to the second path. Another intermediate node M repeats the foregoing process, until the first RP reaches the source node S. At this time, step 105 is completed.

When the intermediate node M and the source node S receive the first RP, if no routing table entry is created, or a routing table entry needs to be recreated, step 106 may be performed, that is, a routing table entry is created according to the second path. Specifically, the routing table entry may include the destination address, and an address of a next hop node and an outbound interface. For example, the foregoing example of the second path is still used. When receiving the first RP, the intermediate node M3 performs destination address matching. When finding that no routing table entry of the destination node D has been created, the intermediate node M3 creates a routing table entry. A possible routing table form is shown in Table 1.

TABLE 1

| Destination address | Next hop node | Outbound interface |
|---|---|---|
| IP address of the destination node D | IP address of a node D | 2 |

It should be noted that each node generally interacts with a neighboring node, to obtain a correspondence between an address of the neighboring node and an outbound interface. Therefore, an outbound interface corresponding to a next hop node may be obtained according to an address of the next hop node on the second path. Certainly, it may also be that the intermediate node M and the source node S use an interface of receiving the first RP packet as the outbound interface of the next hop node.

Similarly, when receiving the first RP, the intermediate node M2 performs destination address matching. The intermediate node M2 creates a routing table entry when finding that no routing table entry of the destination node D has been created. A possible routing table form is shown in Table 2.

TABLE 2

| Destination address | Next hop node | Outbound interface |
|---|---|---|
| IP address of the destination node D | IP address of the intermediate node M3 | 3 |

The intermediate node M repeats the foregoing steps to create a routing table entry corresponding to the destination node D. When the first RP reaches the source node S, the source node S performs destination address matching. When finding that no routing table entry of the destination node D has been created, the source node S creates a routing table entry. A possible routing table form is shown in Table 3.

TABLE 3

| Destination address | Next hop node | Outbound interface |
|---|---|---|
| IP address of the destination node D | IP address of the intermediate node M1 | 4 |

At this time, the source node S and the intermediate node M have created the routing table entries for the destination node D. Therefore, after step 106, when a service packet needs to be sent from the source node S to the destination node D, the source node S and the intermediate node M may perform routing according to the foregoing the routing table entries, forward the service packet until the service packet reaches the destination node D.

It can be learned from the foregoing description that, in this embodiment of the present invention, nodes on a path between the source node S and the destination node D are recorded by using a probe packet, and a response packet is forwarded from the destination node D to the source node S along the reverse path, so that the source node S and the intermediate node M conveniently create the routing table entries. Compared with a routing table entry creation manner described in the IGP protocol in the prior art, the routing table creation method in this embodiment of the present invention is simpler, and each node can implement routing table creation with zero configurations.

Optionally, the first EP further includes a service identifier and/or a service target. Specifically, there are three scenarios: The first EP further includes the service identifier, the first EP further includes both the service identifier and the service target, or the first EP further includes the service target.

The service identifier is a unique identifier of a service. For example, the service identifier is a digital certificate specific to the service, and the digital certificate may be assigned by the source node S or obtained by applying to a specific server by the source node S. The digital certificate is globally unique. For another example, the service identifier of the service may be represented by an identifier of the source node S plus a sequence number.

Certainly, in an actual application, the service identifier may not be unique. The service identifier may be used along with another identifier to uniquely determine a service.

The service target may be one or a combination of requirements including quantified quality of service (English: Quality of Service, QoS for short) of a user service. For example, the service target may be one or more of a minimum delay, a minimum packet loss rate, a minimum jitter (specific to a voice service), minimum costs, or the like.

A default service target (such as, a minimum quantity of hops) may be preset on a network. At this time, the first EP may include only a service identifier, or may not include a service identifier.

Correspondingly, the first RP also includes the service identifier and/or the service target. Specifically, the first RP includes the one that is included in the first EP.

Optionally, in step 106, when the routing table entry is created, the routing table entry further includes the service identifier and/or the service target. That is, the routing table entry may include the service identifier only, may include the service target only, or may include both the service identifier and the service target. Functions of the service identifier and the service target in the routing table entry are described below.

Therefore, in a process of performing step 105, the method further includes: creating a path evaluation table entry according to the second path, and the service identifier and/or the service target, where the path evaluation table entry includes the source address and the destination address, the address of the next hop node and the outbound interface, an evaluated value that is of both the next hop node and the outbound interface, and the service identifier and/or the service target.

It should be noted that the service identifier and/or the service target as a whole is a counterpart of the second path. The service identifier and/the service target includes three scenarios: only the service identifier is included, only the service target is included, and both the service identifier and the service target are included.

In a specific implementation process, the intermediate node M and the source node S that receive the first RP may create a path evaluation table entry according to the second path, the service target, and the like. A possible path evaluation table entry is shown in Table 4 below.

TABLE 4

| Source address | Destination address | Address of a next hop node | Outbound interface | Service identifier | Service target | Evaluated value |
|---|---|---|---|---|---|---|

The evaluated value that is of both the next hop node and the outbound interface is determined, based on a preset rule and according to the service target. In an actual application, the service target (for example, a delay and a packet loss rate) may be quantified, and is further converted into a value, that is, an evaluated value. Optionally, when there are multiple targets, a weight may be set for each target before the target is quantified. When the target includes a delay, the delay may be determined by using the time stamp described above.

For example, when receiving the first RP, the source node S creates the path evaluation table entry according to the second path, the service identifier, and the service target. The service target carried in the first RP is low delay, and the service identifier is b1. A created routing evaluation table entry is shown in Table 5.

TABLE 5

| Source address | Destination address | Next hop node | Outbound interface | Service identifier | Target | Evaluated value |
|---|---|---|---|---|---|---|
| IP address of the source node S | IP address of the destination node D | IP address of the intermediate node M1 | 4 | b1 | Low delay | 8 |

In table 5, the evaluated value is a value calculated according to the rule described above or another rule, and is merely used as an example and not intended to limit the present invention.

Optionally, adaptability of the routing table is provided to monitor path performance and optimize the routing table, so that the network can more quickly respond to a network traffic change. Therefore, the method further includes: generating a second probe packet, where the second probe packet has the source address and the destination address; sending, from the source node the second probe packet based on a predetermined probability and according to a pre-created routing table entry, until the second probe packet reaches the destination node on the network, and recording addresses of nodes through which the second probe packet passes, to form a third path; generating a fourth path according to the third path, where the fourth path is a reverse path of the third path; generating a second response packet, where the second response packet includes the fourth path; and sending the second response packet until the second response packet reaches the source node along the fourth path.

Optionally, if the destination address and the like are successfully matched in the routing table entry, and an address of a next hop on the fourth path and an outbound interface are the same as an address of a next hop and an outbound interface in the routing table entry, that is, the addresses of the next hops are the same and the outbound interfaces of the next hop nodes are also the same, an evaluated value that is of both the next hop node and the outbound interface in a pre-created routing evaluation table entry is updated.

Optionally, the evaluated value that is of both the next hop node and the outbound interface is updated according to information carried in the second RP. For example, if the second RP includes a service target, which is, for example, low delay, the second RP carries a time stamp of reaching each node by the second RP. Therefore, the evaluated value that is of both the next hop node and the outbound interface may be recalculated according to the time stamp. Then, the recalculated evaluated value is used to replace an original evaluated value. This part of content can be considered as an update of original path information.

Optionally, the pre-created routing evaluation table entry may be created by using the foregoing method or in another manner.

Optionally, the source node S may generate a second EP for a new service that needs to access the network, or for an old service.

Optionally, the second EP may be sent periodically to perform path monitoring and path discovery.

The source node S and the intermediate node M have already created, by using the foregoing method or another method, routing table entries for the destination node D. Therefore, the source node S and the intermediate node M send, the second EP based on a predetermined probability and according to the already-created routing table entries, until the second EP reaches the destination node D. In this sending process, addresses of nodes through which the second EP passes are recorded to form a third path. This step is similar to step 102, and details are not repeated herein.

After the second EP reaches the destination node D, the destination node obtains the third path recorded in the second EP, and generates a fourth path according to the third path. The fourth path is a reverse path of the third path (if the third path has a loop, the loop is removed). This step is similar to step 103, and details are not repeated herein.

Similar to step 104, the destination node D generates a second RP, and the second RP includes the fourth path. Then, a step similar to step 105 is performed, that is, the second RP is sent along the fourth path until reaching the source node S. In a process of performing this step, if a match is successfully found in a routing table entry of a node, such as the intermediate node M and the source node S, that receives the second RP, and an address of a next hop and an outbound interface of an address of the node on the fourth path are the same as an address of a next hop and an outbound interface in the routing table entry, the foregoing evaluated value is updated.

For example, it is assumed that an evaluation criterion of a service is delay, and a new time stamp and a new delay value are generated upon arrival of an RP, the evaluated value that is of both the next hop node and the outbound interface may be updated according to the new time stamp and the new delay value.

Optionally, the predetermined probability may be set according to an actual case. For example, the predetermined probability is assumed to be 95%; in other words, there is a 5% probability that the second EP is randomly routed, instead of being forwarded according to an original routing table entry. If the second EP is forwarded completely according to the routing table entry, a match for the second RP may be successfully found on the intermediate node and the source node S, and the address of the next hop on the fourth path and the outbound interface are the same as the address of the next hop and the outbound interface in the routing table entry. In other words, such a second EP is used to monitor an original path, and may be used to update original path information according to a monitoring result.

If some intermediate nodes M or the source node S does not forward the second EP according to the routing table entry, a node receiving the second RP may not be a node on the second path, and therefore no routing table entry for the destination node D is created. In this case, the node receiving the second RP and the intermediate node M may perform matching by using the destination address. If it is found that no routing table entry is created, that is, no match is successfully found, a new routing table entry may be created in a manner described in step 106. In this embodiment, the second EP may be used to discover a new path, and helps implement coexistence of multiple paths.

Optionally, a new path evaluation table entry may further be created in a manner described above.

Optionally, if the second EP is on some intermediate nodes M or the source node S, and is not forwarded according to the routing table entry, a node receiving the second EP may also be a node on the second path, for example, the intermediate node M3. In this way, a match is successfully found in the routing table entry. However, although the destination address is matched, an address of a next hop and an outbound interface of an address of the intermediate node M3 on the fourth path may be probably different from the address of the next hop and the outbound interface that are obtained in step 106. In this case, an address of a new next hop node and a new outbound interface may be added to the routing table entry, and an evaluated value that is of both the new next hop node and the new outbound interface may be added to the foregoing path evaluation table entry. Alternatively, whether to update the routing table entry is determined. In this embodiment, this may be considered as new path discovery, and helps find a better path.

Optionally, whether to update the routing table entry may be determined according to the evaluated value that is of both the new next hop node and the new outbound interface and an evaluated value that is of both an original next hop node and an original outbound interface. For example, it is assumed that the target is low delay, the evaluated value that is of both the original next hop node and the original outbound interface is 0.05, and the evaluated value that is of both the new next hop node and the new outbound interface and that is determined according to the service target and a new time stamp on the fourth path is 0.04. Then, the routing table entry is optimized, and a service packet is forwarded according to a path of the new next hop node subsequently.

Certainly, in an actual application, whether to update the routing table entry may also be determined according to another rule, for example, determining the evaluated value that is of both the new next hop node and the new outbound interface, inputting the evaluated value that is of both the new next hop node and the new outbound interface into a random neural network, and determining, according to a computation result of the random neural network, whether to update the routing table entry. Each neuron of the random neural network is corresponding to an outbound interface, and the random neural network is trained by using a historical evaluated value that is of both a next hop node and an outbound interface.

For example, the intermediate node M may create an artificial neural network for each service, for example, a granularity may be a tri-tuple (a source address, a destination address, and a service identifier or target). Based on a machine learning algorithm, the neural network is trained by using a real-time measured value, such as an evaluated value, of the foregoing network, and whether to update the routing table entry is determined according to a training result. The following briefly describes an implementation of a random artificial neural network in this embodiment of the present invention. For example, each interface 50 of the intermediate node M is corresponding to a neuron. The neuron has two attributes, namely, an excitement weight and an inhibition weight. The intermediate node M obtains an evaluated value G in the foregoing manner, and R=1/G. Then, a threshold is calculated according to a preset algorithm, for example, $T_k=aT_{k-1}+(1-a)R_k$, where a value of a is within a range (0-1) and is used to adjust weights of $T_{k-1}$ and $R_k$, $T_k$ is a dynamic value and is used to track a historical award value, and k=1, 2, 3 . . . , and is a measured value of a continuously generated award value R. Then, increasing ranges of the two attributes of the neuron depend on the values of $T_{k-1}$ and $R_k$. Specifically, when $T_{k-1}$ is less than or equal to $R_k$, an award operation is triggered; as a result, an excitement weight of a neuron 2 (assuming that a neuron corresponding to a current outbound interface is the neuron 2) is greatly increased, and an inhibition weight of another neuron is slightly increased. If $T_{k-1}$ is greater than $R_k$, a punishment operation is performed; as a result, an inhibition weight of the neuron 2 is greatly increased, and an excitement weight of another neuron is slightly increased. When a new evaluated value is obtained, processing is continuously performed in the foregoing manner, to continuously train the neural network. Finally, an outbound interface of a next hop is selected according to a computation result of the neural network. Theoretically, an outbound interface with a larger excitement value is likely to be selected. If a newly selected outbound interface is different from an original outbound interface, the routing table entry may be updated.

Optionally, if the second EP is on some intermediate nodes M or the source node S and is not forwarded according to the routing table entry, a node receiving the second RP may also be a node on the second path, for example, the intermediate node M1. In this way, a match is successfully found in the routing table entry. It is assumed that the destination address is matched on the M1, and an address of a next hop and an outbound interface of the address of the intermediate node M1 on the fourth path are the same as the address of the next hop and the outbound interface that are obtained in step 106. In this case, optionally, the evaluated value that is of both the next hop node and the outbound interface in the path evaluation table entry may be updated.

The foregoing describes an implementation of creating, monitoring, and optimizing the routing table; the following describes how to forward a service packet.

IP forwarding in the present invention supports forwarding of a packet that includes a service identifier and/or a service target, and may also be used for a packet that does not include a service target and/or a service identifier. That is, when an IP routing table is created, items of the service identifier and/or the service target are also added. If a data packet carries a service identifier and/or a service target, longest match is performed to select a routing table entry whose service identifier and/or service target matches the service identifier and/or the service target.

Specifically, for the source node S and the intermediate node M, the method includes:

receiving a service packet, where the service packet has a destination address and includes a service identifier and/or a service target;

performing longest matching in a pre-created routing table entry according to the destination address, and the service identifier and/or the service target, where the routing table entry includes the destination address, an address of a next hop node and an outbound interface, and the service identifier and/or the service target; and sending the service packet by using an address of a next hop node and an outbound interface that are successfully matched in a routing table entry.

It should be noted that, in this embodiment, target objects of the service identifier and/or the service target are both the service identifier and the service target. The service identifier and/or the service target as a whole is a counterpart of another target object.

Optionally, in this embodiment, a longest matching principle is: When multiple items in a routing table can match a destination address on an IP network, one having a longest (most precise) mask is used as a matched item to determine a next hop. This is also referred to as longest prefix matching, and is a path selection algorithm used by a router for routing table searching.

For example, the following IPv4 routing table is considered:

192.168.20.16/28 e0
192.168.0.0/16 s0

When a destination address 192.168.20.19 is searched for, it can be easily learned that both the foregoing two items are matched, that is, both the two items include the searched-for destination address. In this case, the first item (which is more precise) is selected as a match according to the longest mask matching principle. Therefore, a data packet is sent by using e0.

For another example, in an IPv6 scenario, the following IPv6 routing table is considered:

2001:db8:21d0:3f48:1b9:88d1:cf98:fcaf/128 e0
::/0 s0

When a destination address 2001:db8:21d0:3f48:1b9: 88d1:cf98:fcaf is searched for, it is found that both the foregoing two items are matched, that is, both the two items include the searched-for destination address. In this case, the first item (which is more precise) is selected as a match according to the longest mask matching principle. Therefore, a data packet is sent by using e0.

Optionally, in this embodiment, successfully matching means that both the destination address and the service identifier and/or the service target are matched. Because in the prior art, convergence is performed merely according to a destination address without differentiating a service. This leads to a larger granularity in a conventional routing scheme. However, in this embodiment of the present invention, convergence is performed according to the destination address and the service identifier and/the service target, and therefore, a granularity is smaller.

Figure 4:
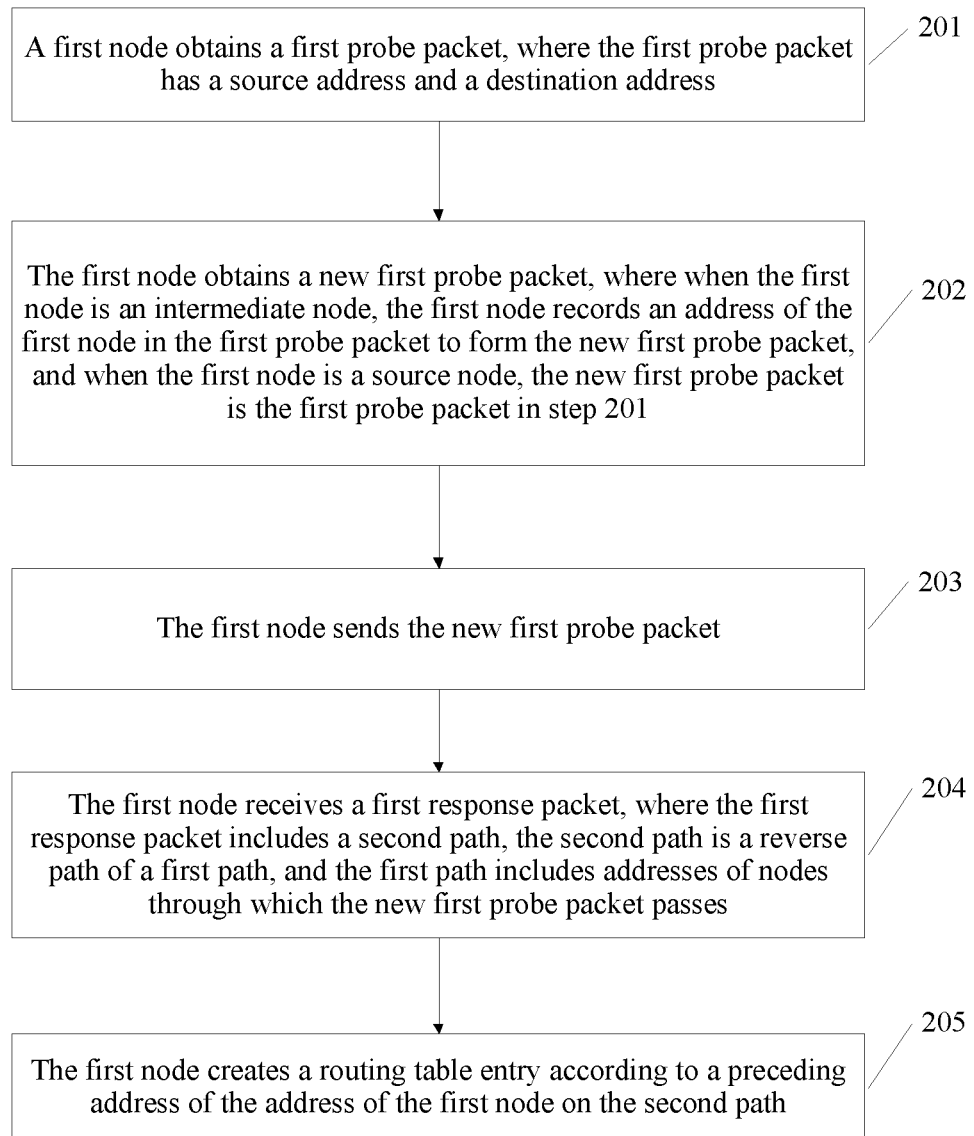
FIG. 4 is a flowchart of another routing table creation method according to an embodiment of the present invention.

The following describes a routing table creation method performed by a source node corresponding to a source address or performed by an intermediate node side on a path between the source node and a destination node corresponding to a destination address. For ease of description, the source node and the intermediate node are collectively referred to as a first node. Referring to FIG. 4, FIG. 4 is a flowchart of a routing table creation method performed on a first node side according to an embodiment of the present invention. The method includes the following steps.

Step 201: A first node obtains a first probe packet, where the first probe packet has a source address and a destination address.

Step 202: The first node obtains a new first probe packet, where when the first node is an intermediate node, the first node records an address of the first node in the first probe packet to form the new first probe packet, and when the first node is a source node, the new first probe packet is the first probe packet in step 201.

Step 203: The first node sends the new first probe packet.

Step 204: The first node receives a first response packet, where the first response packet includes a second path, the second path is a reverse path of a first path (a loop is removed if there is any), and the first path includes addresses of nodes through which the new first probe packet passes.

Step 205: The first node creates a routing table entry according to a preceding address of the address of the first node on the second path, where the routing table entry includes the destination address, and an address of a next hop node and an outbound interface, and the address of the next hop node is the preceding address.

The preceding address is filled in an address bar of the next hop node in the routing table entry.

When the first node is a source node S, step 201 includes: The first node generates a first EP. For example, a processor 10 of the first node may generate the first EP.

When the first node is an intermediate node M, step 201 includes: The first node receives a first EP. For example, a receiver 30 of the first node receives the first EP by using an interface 50.

In step 202, specifically, for example, the processor 10 of the first node encapsulates the address of the first node into the first EP, to form a new first EP.

In step 203, specifically, for example, a transmitter 20 of the first node sends the new first EP by using the interface 50.

In step 204, specifically, for example, the receiver 30 of the first node receives the first RP by using the interface 50.

For details about an implementation of step 205, refer to the foregoing description in step 106. Specifically, step 205 may be performed by the processor 10 of the first node.

Optionally, the method further includes: creating, by the first node, a path evaluation table entry, where the path evaluation table entry includes the source address and the destination address, the address of the next hop node and the outbound interface, an evaluated value that is of both the next hop node and the outbound interface, and a service identifier and/or a service target. The address of the next hop node is the preceding address. A specific implementation process has been described above, and details are not repeated herein. This step may be performed by the processor 10 of the first node.

Optionally, step 203 includes: The first node randomly selects a next hop node and an outbound interface, and sends the new first probe packet. In an actual application, the new first probe packet may also be sent based on another rule. For example, the new first EP may be sent by using a preset fixed interface, or the new first EP may be sent in a broadcast manner.

Optionally, the method further includes: obtaining, by the first node, a second probe packet, where the second probe packet has the source address and the destination address; obtaining a new second probe packet, where when the first node is an intermediate node, the first node records the address of the first node into the second probe packet to form the new second probe packet; and when the first node is a source node, the new second probe packet is the second probe packet; sending, by the first node, the new second probe packet based on a predetermined probability and according to the routing table entry; receiving, by the first node, a second response packet, where the second response packet includes a fourth path, the fourth path is a reverse path of a third path (a loop is removed if there is any), and the third path includes addresses of nodes through which the new second probe packet passes; and if a match is successfully found in the routing table entry, and a preceding address of the address of the first node on the fourth path is the same as the address of the next hop node in the routing table entry, optionally, updating, by the first node, an evaluated value that is of both the next hop and the outbound interface in a path evaluation table entry. For a specific implementation process of the method, refer to the foregoing description, and details are not repeated herein.

Further, the method further includes: if no match is successfully found in the routing table entry, creating, by the first node, a new routing table entry according to the preceding address of the address of the first node on the fourth path.

Further, the method further includes: if a match is successfully found in the routing table entry, and the preceding address of the address of the first node on the fourth path is different from the address of the next hop node in the routing table entry, optionally, determining whether to update the routing table entry.

Optionally, the determining whether to update the routing table entry includes: determining, by the first node, an evaluated value that is of both a new next hop node and a new outbound interface, and determining, by the first node according to the evaluated value that is of both the new next hop node and the new outbound interface and the evaluated value that is of both the next hop node and the outbound interface in the path evaluation table entry, whether to update the routing table entry.

Alternatively, an evaluated value that is of both a new next hop node and a new outbound interface is determined, the evaluated value that is of both the new next hop node and the new outbound interface is input into a random neural network, and whether to update a routing table is determined according to a computation result of the random neural network, where each neuron of the random neural network is corresponding to an outbound interface, and the random neural network is trained by using a historical evaluated value that is of both a next hop node and an outbound interface.

Implementations of the foregoing steps of the method have been described above, and details are not repeated herein.

Figure 5:
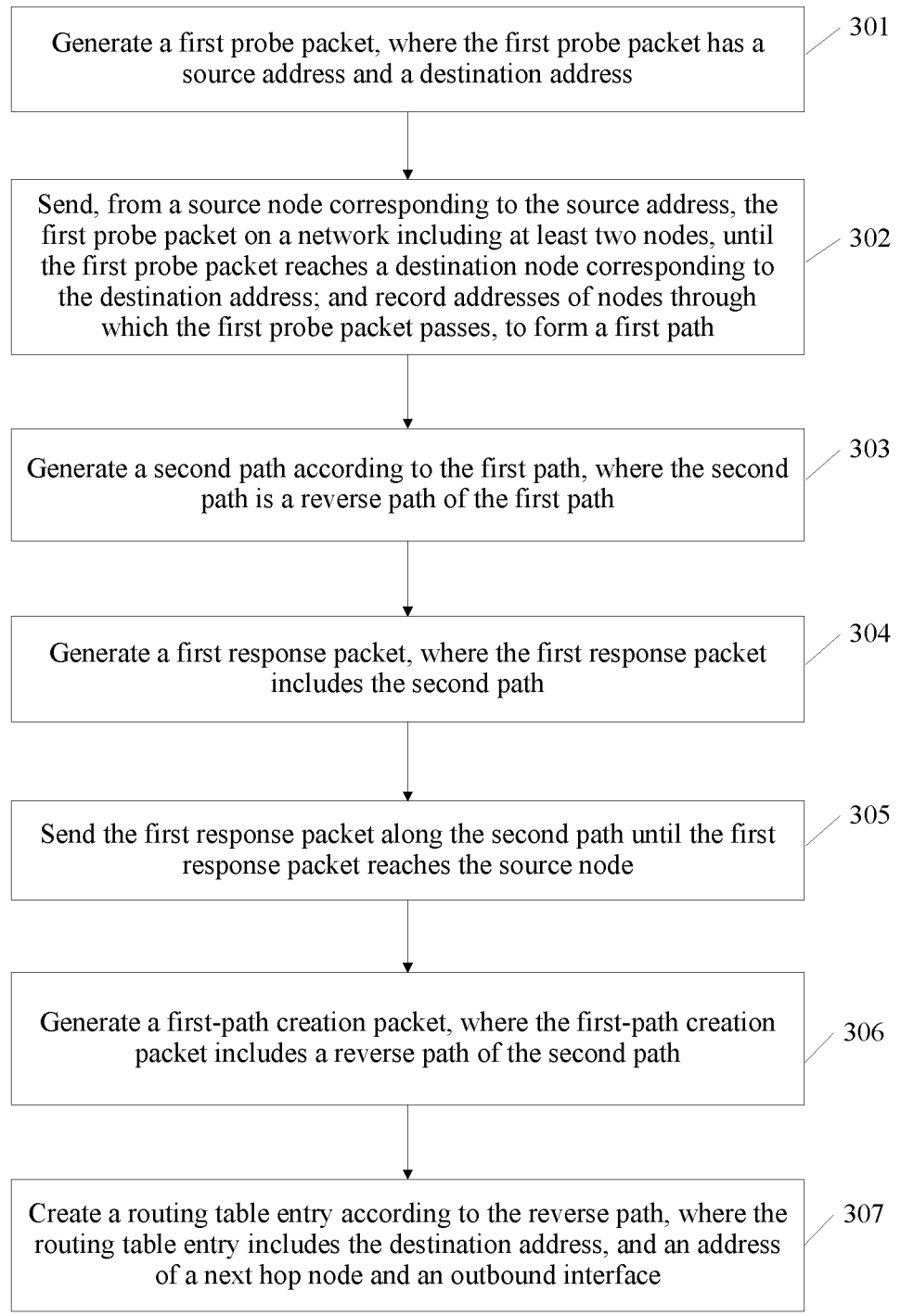
FIG. 5 is a flowchart of still another routing table creation method according to an embodiment of the present invention.

The following describes another routing table creation method. Referring to FIG. 5, the method includes the following steps.

Step 301: Generate a first probe packet, where the first probe packet has a source address and a destination address.

Step 302: Send, from a source node corresponding to the source address, the first probe packet on a network including at least two nodes, until the first probe packet reaches a destination node corresponding to the destination address; and record addresses of nodes through which the first probe packet passes, to form a first path.

Step 303: Generate a second path according to the first path, where the second path is a reverse path of the first path.

Step 304: Generate a first response packet, where the first response packet includes the second path.

Step 305: Send the first response packet along the second path until the first response packet reaches the source node.

Step 306: Generate a first-path creation packet, where the first-path creation packet includes a reverse path of the second path.

Step 307: Create a routing table entry according to the reverse path, where the routing table entry includes the destination address, and an address of a next hop node and an outbound interface.

Specific implementations of step 301 to step 305 are similar to those of the foregoing step 101 to step 105. A specific implementation of step 307 is similar to that of step 106.

In step 306, the second path is the reverse path of the first path whose loop is removed.

Optionally, a bandwidth requirement of the service is carried in the path create packet, and a node on a path pre-allocates a bandwidth resource for the service. In the method, the source node may receive multiple RP packets carrying the second path. The source node may select one or more paths to transmit the service, so as to meet the bandwidth requirement of the service.

It can be learned from the foregoing description that the method in this embodiment of the present invention avoids a routing loop risk caused by independently determining a forwarding interface by each router. Further, the method in this embodiment of the present invention supports resource reservation on a path, and provides better support for service transmission on multiple paths.

Optionally, the routing table entry further includes a service identifier and/or a service target.

Optionally, the method further includes: for the source node, if a routing table entry has been created, and an outbound interface in the already-created routing table entry is different from an outbound interface corresponding to the reverse path, determining whether the outbound interface corresponding to the reverse path is better; and when the outbound interface corresponding to the reverse path is better, updating the already-created routing table entry. Specifically, this step may be performed by a processor 10 of the source node.

Optionally, whether the outbound interface corresponding to the reverse path is better may be specifically determined by using an evaluated value of the outbound interface, or may be determined by using, for example, the foregoing random artificial neural network. A specific implementation process is similar to that described above, and details are not repeated herein.

Optionally, after step 307, the method further includes: sending the first-path creation packet to another intermediate node on the reverse path, so that the another intermediate node creates a routing table entry according to the reverse path.

Optionally, the method further includes: generating a second probe packet, where the second probe packet has the source address and the destination address; sending, from the source node on the network, the second probe packet based on a predetermined probability and according to a pre-created routing table entry, until the second probe packet reaches the destination node, and recording addresses of nodes through which the second probe packet passes, to form a third path; generating a fourth path according to the third path, where the fourth path is a reverse path of the third path; generating a second response packet, where the second response packet includes the fourth path; sending the second response packet along the fourth path until the second response packet reaches the source node; and if a match is successfully found in the routing table entry, and an address of a next hop on the fourth path and an outbound interface are the same as an address of a next hop and an outbound interface in the routing table entry, updating an evaluated value that is of both the next hop node and the outbound interface in a pre-created path evaluation table entry.

The last step of the method is executed by the source node. The pre-created routing table may be created by using the method shown in FIG. 3, may be created by using the method shown in FIG. 5, or may be created in another manner. The rest of this part of content is similar to content of describing the second EP, and details are not repeated herein.

Figure 6:
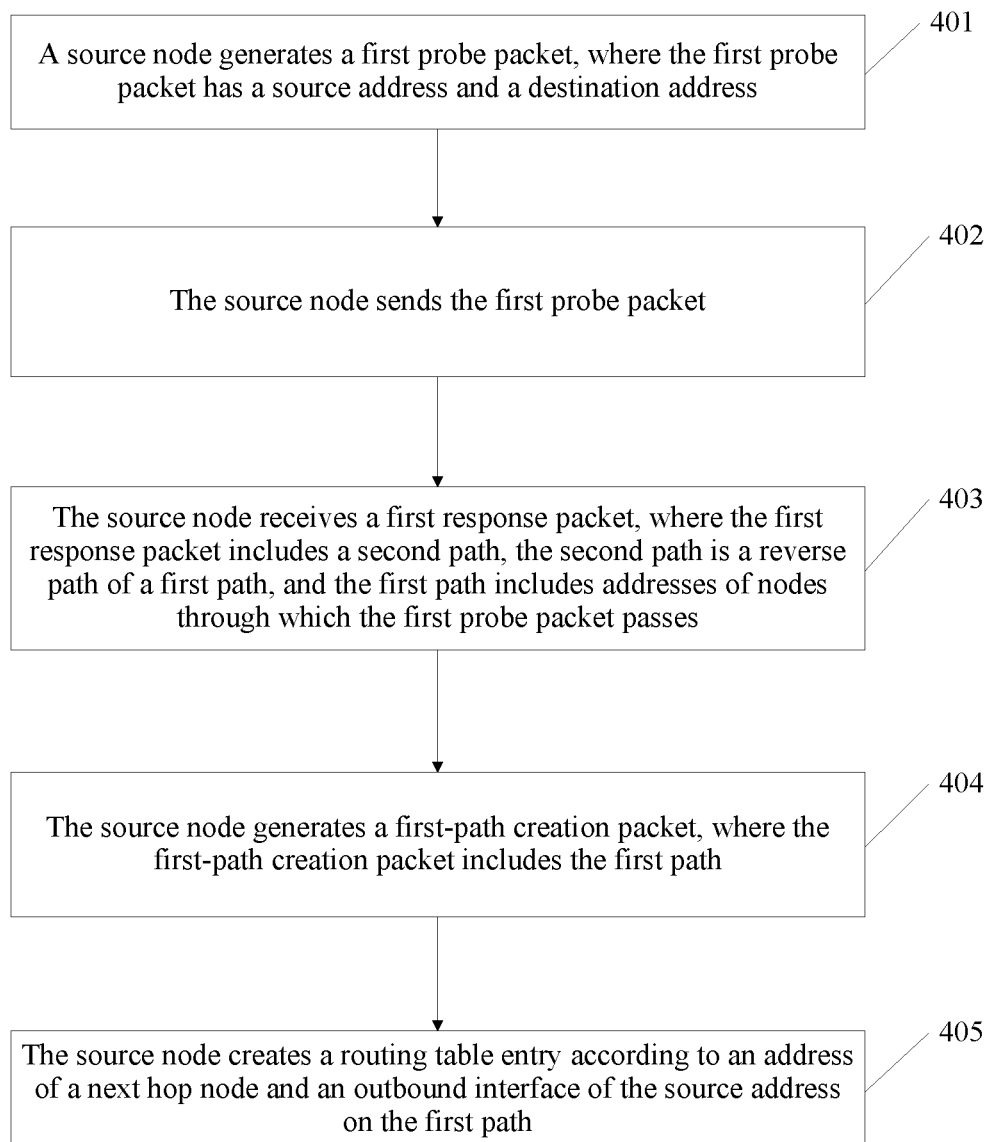
FIG. 6 is a flowchart of a routing table creation method performed on a source node side according to an embodiment of the present invention.

Next, referring to FIG. 6 again, FIG. 6 is a flowchart of the method shown in FIG. 5 on the source node side. The method includes the following steps.

Step 401: A source node generates a first probe packet, where the first probe packet has a source address and a destination address, and the source address is an address of the source node.

Step 402: The source node sends the first probe packet.

Step 403: The source node receives a first response packet, where the first response packet includes a second path, the second path is a reverse path of a first path, and the first path includes addresses of nodes through which the first probe packet passes.

Step 404: The source node generates a first-path creation packet, where the first-path creation packet includes the first path.

Step 405: The source node creates a routing table entry according to an address of a next hop node and an outbound interface of the source address on the first path, where the routing table entry includes the destination address, and the address of the next hop node and the outbound interface.

Step 401 is similar to step 201, step 402 is similar to step 203, and step 404 and step 405 are similar to step 306 and step 307, respectively.

Optionally, the method further includes: if a routing table entry has been created, and an outbound interface in the already-created routing table entry is different from an outbound interface corresponding to the first path, determining, by the source node, whether the outbound interface corresponding to the first path is better; and when the outbound interface corresponding to the first path is better, updating, by the source node, the already-created routing table entry.

Optionally, the method further includes: sending, by the source node, the first-path creation packet to an intermediate node between the source node and the destination node on the first path, so that the intermediate node updates a routing table entry of the intermediate node according to an address of a next hop and an outbound interface of an address of the intermediate node on the first path.

Optionally, the method further includes: generating, by the source node, a second probe packet, where the second probe packet has the source address and the destination address; sending, by the source node, the second probe packet based on a predetermined probability and according to the routing table entry; receiving, by the source node, a second response packet, where the second response packet includes a fourth path, the fourth path is a reverse path of a third path, and the third path includes addresses of nodes through which the second probe packet passes; and if a match is successfully found in the routing table entry, and an address of a next hop and an outbound interface of the source address on the fourth path are the same as an address of a next hop and an outbound interface in the routing table entry, optionally, updating, by the source node, an evaluated value that is of both the next hop node and the outbound interface in a pre-created path evaluation table entry.

Figure 7:
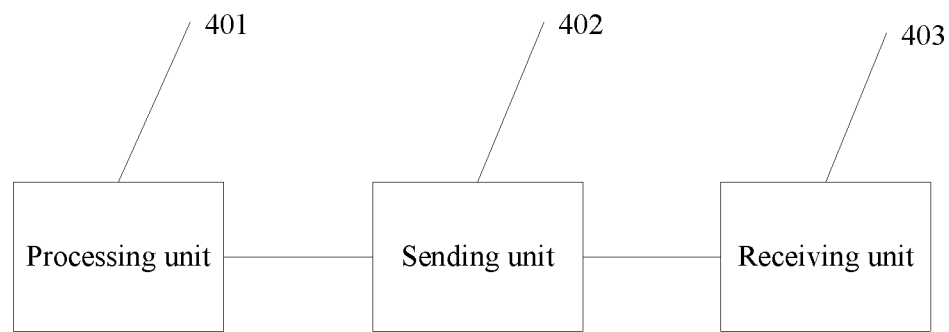
FIG. 7 is a structural diagram of another electronic device according to an embodiment of the present invention.

Based on the same inventive concept, an embodiment of the present invention further provides an electronic device. Referring to FIG. 7, the electronic device includes a processing unit 401, a sending unit 402, and a receiving unit 403.

The electronic device may be used to implement any one of the methods described above. In an actual application process, another unit module may be further configured according to an actual need.

Specifically, when the electronic device is configured to implement the method in FIG. 4, the processing unit 401 is configured to: obtain a first probe packet, where the first probe packet has a source address and a destination address, and the electronic device is a source node corresponding to the source address or an intermediate node on a path between the source node and a destination node corresponding to the destination address; and obtain a new first probe packet based on the first probe packet, where when the electronic device is the intermediate node, an address of the electronic device is recorded in the first probe packet to form the new first probe packet, and when the electronic device is the source node, the new first probe packet is the first probe packet. The sending unit 402 is configured to send the new first probe packet. The receiving unit 403 is configured to receive a first response packet, where the first response packet includes a second path, the second path is a reverse path of a first path, and the first path includes addresses of nodes through which the new first probe packet passes. The processing unit 401 is further configured to create a routing table entry according to a preceding address of the address of the electronic device on the second path. The routing table entry includes the destination address, and an address of a next hop node and an outbound interface. The address of the next hop node is the preceding address.

Optionally, the processing unit 401 is further configured to create a path evaluation table entry. The path evaluation table entry includes the source address and the destination address, the address of the next hop node and the outbound interface, an evaluated value that is of both the next hop node and the outbound interface, and a service identifier and/or a service target. The address of the next hop node is the preceding address.

Optionally, the sending unit 402 is configured to: randomly select a next hop node and an outbound interface, and send the new first probe packet.

Optionally, the processing unit 401 is further configured to: obtain a second probe packet, where the second probe packet has the source address and the destination address; and obtain a new second probe packet based on the second probe packet, where when the electronic device is the intermediate node, an address of the electronic device is recorded in the second probe packet to form the new second probe packet, and when the electronic device is the source node, the new second probe packet is the second probe packet.

The sending unit 402 is further configured to send the new second probe packet based on a predetermined probability and according to the routing table entry.

The receiving unit 403 is further configured to receive a second response packet, where the second response packet includes a fourth path, the fourth path is a reverse path of a third path, and the third path includes addresses of nodes through which the new second probe packet passes.

The processing unit 401 is further configured to: if a match is successfully found in the routing table entry, and a preceding address of the address of the electronic device on the fourth path is the same as an address of a next hop node in the routing table entry, update an evaluated value that is of both the next hop node and an outbound interface in the path evaluation table entry.

Optionally, the processing unit 401 is further configured to: if no match is successfully found in the routing table entry, create a new routing table entry according to the preceding address of the address of the electronic device on the fourth path.

Optionally, the processing unit 401 is further configured to: if a match is successfully found in the routing table entry, and the preceding address of the address of the electronic device on the fourth path is different from the address of the next hop node in the routing table entry, determine whether to update the routing table entry.

Optionally, the processing unit 401 is configured to: determine an evaluated value that is of both a new next hop node and a new outbound interface, and determine, according to the evaluated value that is of both the new next hop node and the new outbound interface and the evaluated value that is of both the next hop node and the outbound interface in the path evaluation table entry, whether to update the routing table entry.

Optionally, the processing unit 401 is configured to: determine an evaluated value that is of both a new next hop node and a new outbound interface; input the evaluated value that is of both the new next hop node and the new outbound interface into a random neural network; and determine, according to a computation result of the random neural network, whether to update a routing table, where each neuron of the random neural network is corresponding to an outbound interface, and the random neural network is trained by using a historical evaluated value that is of both a next hop node and an outbound interface.

Specifically, when the electronic device is configured to implement the routing table creation method performed on the source node side, the processing unit 401 is configured to generate a first probe packet, where the first probe packet has a source address and a destination address, the source address is an address of the electronic device, and the electronic device serves as a source node. The sending unit 402 is configured to send the first probe packet. The receiving unit 403 is configured to receive a first response packet, where the first response packet includes a second path, the second path is a reverse path of a first path, and the first path includes addresses of nodes through which the first probe packet passes. The processing unit 401 is further configured to: generate a first-path creation packet, where the first-path creation packet includes the first path; and create a routing table entry according to an address of a next hop node and an outbound interface of the source address on the first path, where the routing table entry includes the destination address, and the address of the next hop node and the outbound interface.

Optionally, the processing unit 401 is further configured to: if a routing table entry has been created, and an outbound interface in the already-created routing table entry is different from an outbound interface corresponding to the first path, determine whether the outbound interface corresponding to the first path is better; and when the outbound interface corresponding to the first path is better, update the already-created routing table entry.

Optionally, the sending unit 402 is further configured to send the first-path creation packet to an intermediate node between the source node and the destination node on the first path, so that the intermediate node updates a routing table entry of the intermediate node according to an address of a next hop and an outbound interface of an address of the intermediate node on the first path.

Optionally, the processing unit 401 is further configured to generate a second probe packet, where the second probe packet has the source address and the destination address.

The sending unit 402 is further configured to send the second probe packet based on a predetermined probability and according to the routing table entry.

The receiving unit 403 is further configured to receive a second response packet, where the second response packet includes a fourth path, the fourth path is a reverse path of a third path, and the third path includes addresses of nodes through which the second probe packet passes.

The processing unit 401 is further configured to: if a match is successfully found in the routing table entry, and an address of a next hop and an outbound interface of the source address on the fourth path are the same as an address of a next hop and an outbound interface in the routing table entry, update an evaluated value that is of both the next hop node and the outbound interface in a pre-created path evaluation table entry.

Specifically, when the electronic device is configured to implement the aforementioned service packet sending method, the receiving unit 403 is configured to receive a service packet, where the service packet has a destination address and includes a service identifier and/or a service target. The processing unit 401 is configured to perform longest matching in a pre-created routing table entry according to the destination address, and the service identifier and/or the service target, where the routing table entry includes the destination address, an address of a next hop node and an outbound interface, and the service identifier and/or the service target. The sending unit 402 is configured to send the service packet by using an address of a next hop node and an outbound interface that are successfully matched in the routing table entry.

Various variation manners and specific examples of the methods in the foregoing embodiments are also applicable to the electronic device in this embodiment. After the methods are described above in detail, a person skilled in the art can clearly know an implementation of a routing apparatus between domains. Therefore, for brevity of this specification, details are not repeated herein.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A routing table creation method, comprising:
    obtaining, by a first node, a first probe packet, wherein the first probe packet has a source address and a destination address, and the first node is a source node corresponding to the source address or an intermediate node on a path between the source node and a destination node corresponding to the destination address;
    obtaining, by the first node, a new first probe packet, wherein when the first node is the intermediate node, the first node records an address of the first node in the first probe packet to form the new first probe packet, and when the first node is the source node, the new first probe packet is the first probe packet;
    sending, by the first node, the new first probe packet;
    receiving, by the first node, a first response packet, wherein the first response packet describes a second path, the second path is a reverse path of a first path, and the first path comprises addresses of nodes through which the new first probe packet passes; and
    creating, by the first node, a routing table entry according to a preceding address of the address of the first node on the second path, wherein the routing table entry comprises the destination address, and an address of a next hop node and an outbound interface, and wherein the address of the next hop node is the preceding address of the first node on the second path.

2. The method according to claim 1, wherein the method further comprises:
    creating, by the first node, a path evaluation table entry, wherein the path evaluation table entry comprises the source address and the destination address, the address of the next hop node and the outbound interface, an evaluated value that is of both the next hop node and the outbound interface, and a service identifier and/or a service target, and the address of the next hop node is the preceding address.

3. The method according to claim 1, wherein the sending, by the first node, the new first probe packet comprises:
    randomly selecting, by the first node, a next hop node and an outbound interface, and sending the new first probe packet.

4. A routing table management method, comprising:
    obtaining, by a first node, a second probe packet, wherein the second probe packet has a source address and a destination address, and the first node is a source node corresponding to the source address or an intermediate node on a path between the source node and a destination node corresponding to the destination address;
    obtaining, by the first node, a new second probe packet, wherein when the first node is the intermediate node, the first node records an address of the first node in the second probe packet to form the new second probe packet, and when the first node is the source node, the new second probe packet is the second probe packet;
    sending, by the first node and with a predetermined probability, the new second probe packet according to a pre-created routing table entry;
    receiving, by the first node, a second response packet, wherein the second response packet comprises a fourth path, the fourth path is a reverse path of a third path, and the third path comprises addresses of nodes through which the new second probe packet passes; and
    if a match is successfully found in the routing table entry, and a preceding address of the address of the first node on the fourth path is the same as an address of a next hop node in the routing table entry, updating, by the first node, an evaluated value that is of both the next hop node and an outbound interface in a pre-created path evaluation table entry.

5. The method according to claim 4, wherein the method further comprises:
    if no match is successfully found in the routing table entry, creating, by the first node, a new routing table entry according to the preceding address of the address of the first node on the fourth path.

6. The method according to claim 4, wherein the method further comprises:
    if a match is successfully found in the routing table entry, and the preceding address of the address of the first node on the fourth path is different from the address of the next hop node in the routing table entry, determining, by the first node, whether to update the routing table entry.

7. The method according to claim 6, wherein the determining whether to update the routing table entry comprises:
    determining, by the first node, an evaluated value that is of both a new next hop node and a new outbound interface; and
    determining, by the first node according to the evaluated value that is of both the new next hop node and the new outbound interface and the evaluated value that is of both the next hop node and the outbound interface in the path evaluation table entry, whether to update the routing table entry.

8. The method according to claim 6, wherein the determining whether to update the routing table entry comprises:
    determining an evaluated value that is of both a new next hop node and a new outbound interface; and
    inputting the evaluated value that is of both the new next hop node and the new outbound interface into a random neural network; and determining, according to a computation result of the random neural network, whether to update a routing table entry, wherein each neuron of the random neural network is corresponding to an outbound interface, and the random neural network is trained by using a historical evaluated value that is of both a next hop node and an outbound interface.

9. A routing table creation method, comprising:
    generating, by a source node, a first probe packet, wherein the first probe packet has a source address and a destination address, and the source address is an address of the source node;

sending, by the source node, the first probe packet;

receiving, by the source node, a first response packet, wherein the first response packet describes a second path, the second path is a reverse path of a first path, and the first path comprises addresses of nodes through which the first probe packet passes;

generating, by the source node, a first-path creation packet, wherein the first-path creation packet comprises the first path; and creating, by the source node, a routing table entry according to an address of a next hop node and an outbound interface of the source address on the first path, wherein the routing table entry comprises the destination address, and the address of the next hop node and the outbound interface.

10. The method according to claim 9, wherein the method further comprises:

if a routing table entry has been created, and an outbound interface in the already-created routing table entry is different from an outbound interface corresponding to the first path, determining, by the source node, whether the outbound interface corresponding to the first path is better; and when the outbound interface corresponding to the first path is better, updating, by the source node, the already-created routing table entry.

11. The method according to claim 9, wherein the method further comprises:

sending, by the source node, the first-path creation packet to an intermediate node between the source node and a destination node on the first path, so that the intermediate node updates a routing table entry of the intermediate node according to an address of a next hop and an outbound interface of an address of the intermediate node on the first path.

12. A network, wherein the network comprises a source node, a destination node, and intermediate nodes between the source node and the destination node;

the source node is configured to: generate a second probe packet, and send the second probe packet to a neighboring intermediate node, wherein the second probe packet has a source address of the source node and a destination address of the destination node;

the intermediate nodes from the neighboring intermediate node to a neighboring intermediate node of the destination node are configured to: sequentially send, with a predetermined probability, the second probe packet according to a pre-created routing table entry, until the second probe packet reaches the destination node corresponding to the destination address, and record respective addresses in the second probe packet to form a third path;

the destination node is configured to: generate a fourth path according to the third path, and generate a second response packet, wherein the fourth path is a reverse path of the third path, and the second response packet comprises the fourth path;

the destination node and the intermediate nodes are configured to sequentially send the second response packet along the fourth path until the second response packet reaches the source node; and the intermediate nodes and the source node are configured to: if a match is successfully found in the routing table entry, and an address of a next hop on the fourth path and an outbound interface are different from an address of a next hop and an outbound interface in the routing table entry, add an address of a new next hop node and a new outbound interface node to the routing table entry, and add an evaluated value that is of both the new next hop node and the new outbound interface to a pre-created path evaluation table entry; or determine whether to update the routing table entry.

13. The network according to claim 12, wherein the intermediate nodes and the source node are further configured to: if a match is successfully found in the routing table entry, and the address of the next hop on the fourth path and the outbound interface are the same as the address of the next hop and the outbound interface in the routing table entry, update an evaluated value that is of both the next hop node and the outbound interface in the pre-created path evaluation table entry.

14. The network according to claim 12, wherein the intermediate nodes and the source node are further configured to: if no match is successfully found in the routing table entry, create a new routing table entry according to the fourth path, and create a new path evaluation table entry.

* * * * *